US006695942B2

United States Patent
Testa

(10) Patent No.: US 6,695,942 B2
(45) Date of Patent: Feb. 24, 2004

(54) METHOD OF MANUFACTURING A STEERING WHEEL

(75) Inventor: Giuseppe Testa, Illasi (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 319 days.

(21) Appl. No.: 09/870,913

(22) Filed: Jun. 1, 2001

(65) Prior Publication Data

US 2001/0023622 A1 Sep. 27, 2001

Related U.S. Application Data

(62) Division of application No. 09/481,626, filed on Jan. 12, 2000, now Pat. No. 6,282,982.

(30) Foreign Application Priority Data

Feb. 19, 1999 (EP) .............................. 99830089

(51) Int. Cl.[7] .............................. B32B 31/18
(52) U.S. Cl. .................. 156/222; 156/224; 156/245; 156/242; 74/552; 74/558; 74/558.5; 264/258; 264/319; 29/894.1
(58) Field of Search ................. 156/154, 222, 156/224, 245, 242, 267, 304.5; 74/552, 558, 558.5; 264/250, 257, 258, 319; 29/894.1

(56) References Cited

U.S. PATENT DOCUMENTS 3,394,615 A    7/1968  Brueder ..................... 74/552
4,683,018 A    7/1987  Sutcliffe et al. ............ 156/196

FOREIGN PATENT DOCUMENTS

| DE | 1555182 | 8/1970 | | |
|---|---|---|---|---|
| DE | 1630729 | 8/1971 | | |
| DE | 29813895 | 11/1998 | | |
| GB | 980673 | 10/1962 | | |
| JP | 61-291266 | * 12/1986 | ............ | B62D/1/06 |
| JP | 08310407 | 11/1996 | | |
| JP | 0151174 | 5/2000 | | |

* cited by examiner

Primary Examiner—Michael W. Ball
Assistant Examiner—Jessica Rossi
(74) Attorney, Agent, or Firm—Lonnie Drayer

(57) ABSTRACT

A method of manufacturing motor car steering wheels with an external shell made of composite materials, which comprises preparing a pile of sheets of composite materials, hot molding thereof for obtaining respective half-shells with a shape corresponding to that of respective halves of the steering wheel being manufactured, mechanical flattening of the front surfaces of the two half-shells, applying the two half-shells to opposite parts of a steering wheel body formed by a metallic core covered by resin, and mutual fixing of the two half-shells along said front surfaces. After flattening, the front surfaces of the two half-shells are mechanically worked to form respective complementary teeth which can be male-female coupled when the two half-shells are applied around the steering wheel body.

12 Claims, 3 Drawing Sheets

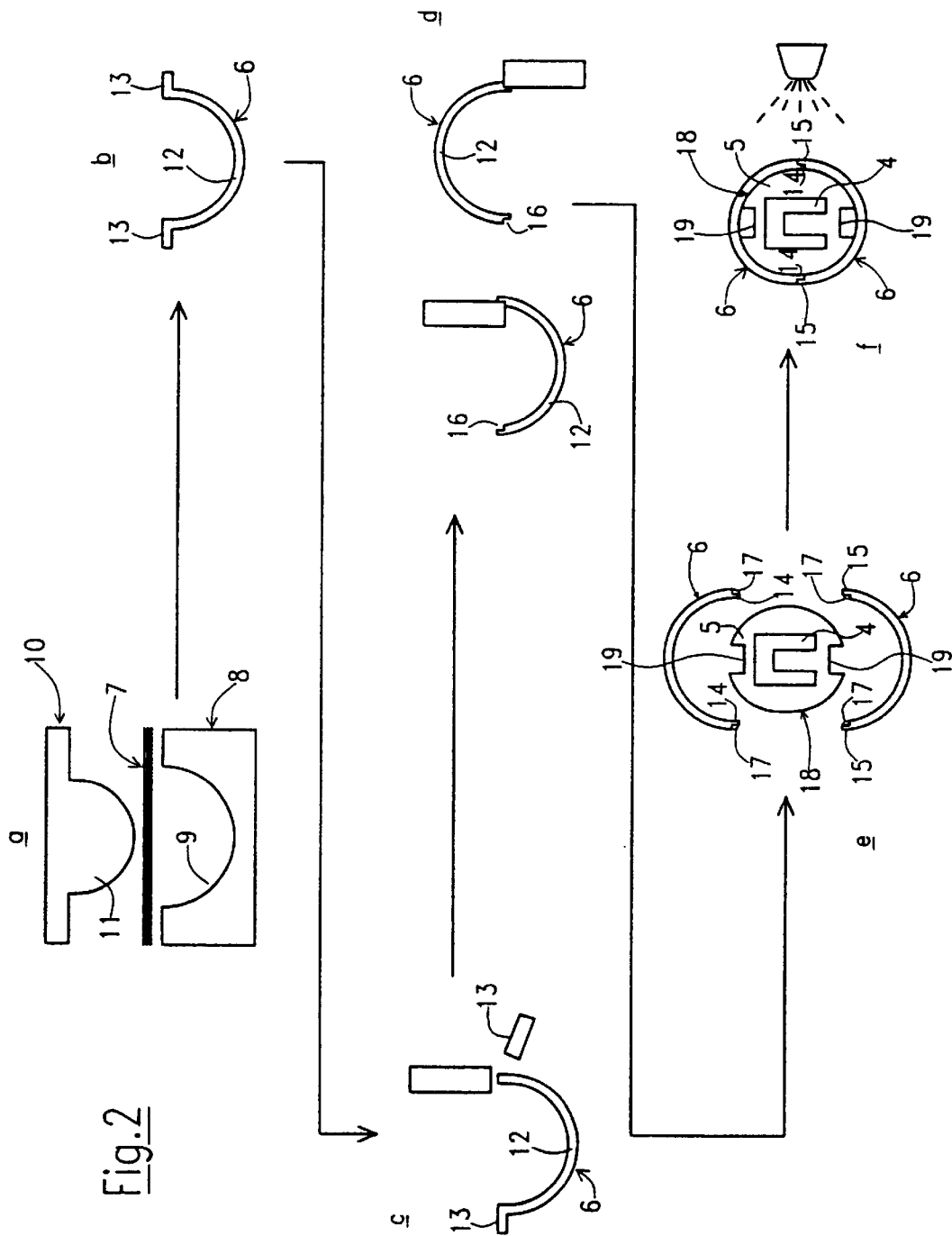

… …

METHOD OF MANUFACTURING A STEERING WHEEL

This is a Divisional of application Ser. No. 09/481,626 Jan. 12, 2000, now U.S. Pat. No. 6,282,982.

BACKGROUND OF THE INVENTION

The present invention relates to a steering wheel with an external shell made of composite materials and the method of manufacturing the same.

Steering wheels for automobiles are presently made of an internal metallic core covered by resin and of an external coating and finishing shell, made of various materials, which represents the appearing part of the steering wheel.

Among the several known processes for manufacturing steering wheels is the process comprising providing for formation of two half-shells by hot pressing of one or more material sheets inside molds of suitable shape, subsequent mechanical flattening working of the junction line of the two half-shells, application of the half-shells on a steering wheel body formed by a metallic core covered by resin and mutual fixing of the two half-shells along said junction line.

An object of the present invention is to improve this known process to make it particularly suitable for providing a steering wheel with half-shells of composite materials solidly joined together.

According to the invention, this object is obtained by a process comprising preparation of piles of sheets of composite materials, hot molding thereof for obtaining respective half-shells with a shape corresponding to that of respective halves of the steering wheel being manufactured, mechanical flattening of the front surfaces of the two half-shells, application of the two half-shells to opposite parts of a steering wheel body formed by a metallic core covered by resin and mutual fixing of the two half-shells along said front surfaces, characterized in that after flattening said front surfaces of the two half-shells are mechanically worked to form respective complementary teeth which can be male-female coupled when the two half-shells are applied around said steering wheel body.

It has been possible to verify that the presence of complementary teeth at the junction lines of the two half-shells allows to provide a very strong connection between the half-shells which is able to resist all the aging and safety test required by the automobile manufacturers.

BRIEF DESCRIPTION OF THE INVENTION

The features of the present invention will be made more evident by the following detailed description of the preferred embodiment thereof which is illustrated by non-limiting way in the accompanying drawings, in which:

FIG. 1 shows, partly in view and partly in section, a typical steering wheel for an automobile;

FIG. 2 schematically shows the several steps of the manufacturing process according to the present invention;

DETAILED DESCRIPTION OF THE INVENTION

Figure 1:
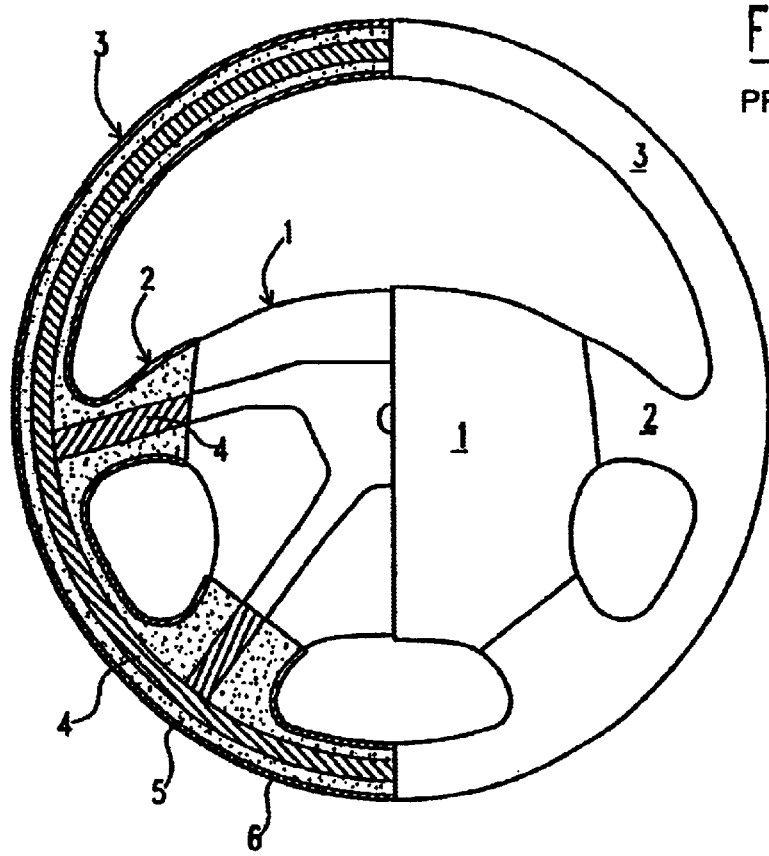

As shown in FIG. 1, a typical steering wheel for a motor car is composed by a central part or hub part 1, a plurality of radial spokes 2 and an external rim 3.

According to the present technology the external rim 3 and the spokes 2 consist of an internal metallic core 4 covered by resin 5 and an external coating and finishing shell, in its turn formed by two half-shells 5 superimposed to each other and joined together.

The two half-shells 6 are manufactured by using the technology schematically illustrated in FIG. 2, steps a)–d).

More precisely, the forming step provides for hot molding of a pile of sheets of composite materials, globally designated with 7 in FIG. 2, step a), inside a metal mold 8 with a cavity 9 of suitable shape, on which a cover 10 with a protrusion 10 of complementary shape with respect to the cavity 9 is superimposed.

The pile 7 may be composed by sheets of various thickness. For example the sheet for contacting the resin may be from 0.1 to 0.6 mm, the intermediate sheet may be from 0.8 to 1.1 mm, and the sheet for constituting the external surface of the half-shell may be from 0.1 to 0.8 mm, so as to produce a total thickness of the half-shell between 1.0 and 2.5 mm.

The single sheets may be of various materials, for example all composite fibers (glass fibers, carbon fibers, aluminum fibers, aramidic fibers, etc.), composite fibers and natural (wood, brier-root, etc.) and/or synthetic materials (polyester, nylon, acrylic, etc.), composite fibers and metal sheets (aluminum, etc.).

The above mentioned fibers may be impregnated with specific resins which at the end of the cycle are able to grant structural rigidity to the half-shell assembly. The resins used for impregnating the fibers can be of various natures, for example epoxy, polyester, polyurethane. The impregnation of the fibers may be carried out both before the use, by means of specific machines which dip the fabric into the resin according a specific process, and during the half-shell molding step, by smearing, injection or other dispensing systems which allow impregnation of the fibers inside the mold.

The molding time depends on the temperature being used and is comprised between 1 and 3.5 minutes. The mold temperature, for an optimal process, is comprised between 120° C. and 180° C. The molding pressure is determined by the amount of air which is left between the upper and lower half-shells.

Figure 3:
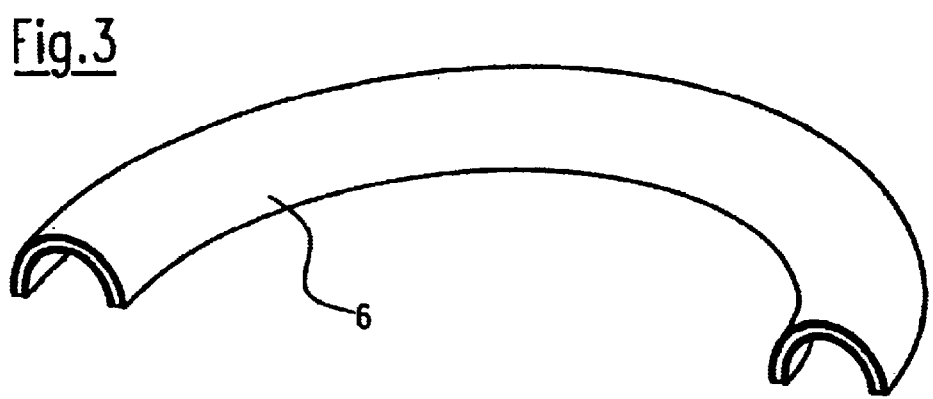
FIG. 3 shows a partial perspective representation of a half-shell after the hot molding step and the subsequent flattening step and before the provision of the coupling teeth.

The half-shell obtained at the end of the molding operation is illustrated in FIG. 2, step b), and comprises a curved central part 12 and two lateral fins 13. The latter are then removed by mechanical flattening working, step c) of FIG. 2. The half-shell is then as shown in FIG. 3.

Two so obtained half-shells are then subjected to a further mechanical working, step d) of FIG. 2, which allows to obtain complementary coupling teeth 14 and 15 on the surfaces 16 of the same half-shells which rest and join each other when the two half-shells go to form the final shell of the steering wheel. The shape and the location of the coupling teeth, shown herein by way of example, can vary according to the assembling necessities.

The final steps of the steering wheel manufacturing process, steps e) and f) of FIG. 2, provide for application of a specific structural glue 17 at the coupling teeth 14 and 15 of the two half-shells (and possibly on the steering wheel body 18), application of the two half-shells, step e), on opposite parts of a previously prepared steering wheel body (formed by the metallic core 4 and the resin covering 5 as previously said with reference to FIG. 1), joining the two half-shells by male-female coupling of the teeth 14 and 15 and gluing of the same by the glue 17 to form one shell around the steering wheel body 18, and finally removal of the glue excess and painting of the completed steering wheel, step f).

It is to be noted that the steering wheel body 18 is preferably provided with two diametrically opposite grooves 19, which serve for compensating the thermal expansions of the resin 5.

Figure 4:
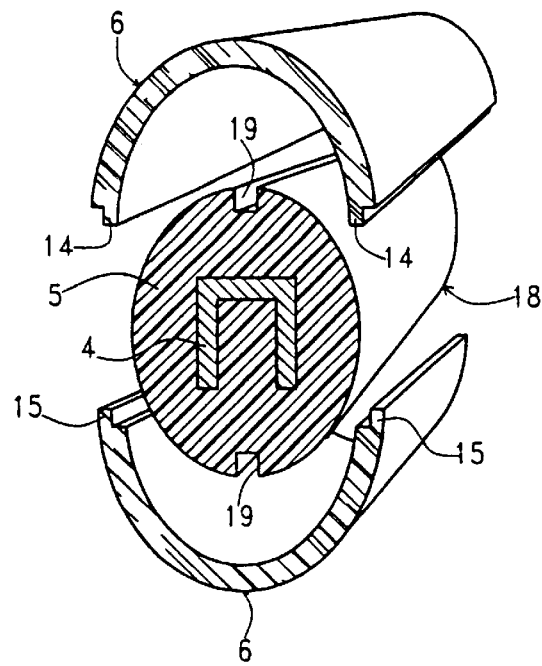
FIG. 4 shows in perspective view, just before the final assembling of the two half-shells, a portion of a steering wheel manufactured by the process according to the invention.

The assembly of the two half-shells 6 and the steering wheel body 18 is shown in perspective view, just before the final assembling, in FIG. 4.

Figure 5:
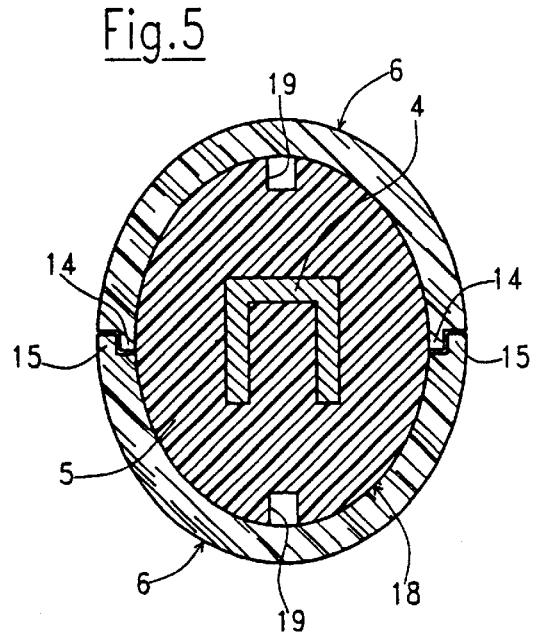
FIG. 5 shows the same steering wheel in cross-section, in assembled condition.

The same assembly is shown in cross-section, with assembling being ended, in FIG. 5.

Figure 6:
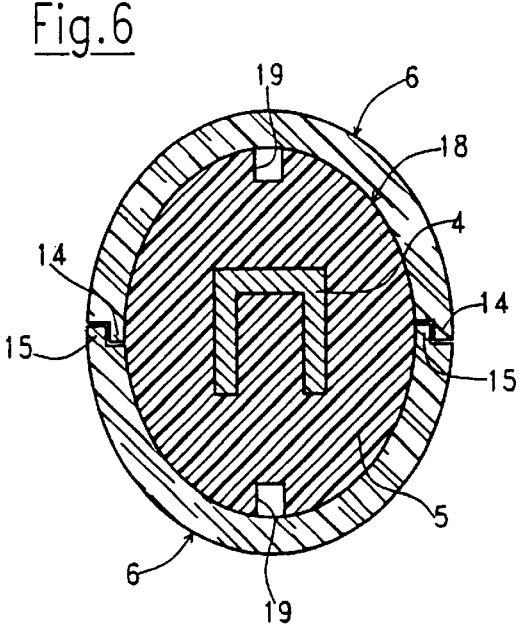
FIG. 6 shows a variant of the steering wheel of FIG. 5, further in cross-section, in assembled condition.

A steering wheel with differently located coupling teeth 14 and 15 is in turn shown, still in cross-section and with the assembling being ended, in FIG. 6.

It is to be understood that while the preferred embodiment of the present invention has been described, various changes and modifications may be made by those skilled in the art without departing from the scope of the invention as set forth in the claims.

I claim:

1. A method of manufacturing a steering wheel with an external shell made of composite materials, which comprises:

preparing a pile of sheets of composite materials;

hot molding the pile of sheets for obtaining respective half-shells with a shape corresponding to that of respective halves of the steering wheel being manufactured;

mechanical flattening of front surfaces of the two half-shells;

mechanical working of the front surfaces of the two half-shells to form respective complementary teeth which can be male-female coupled;

applying the two half-shells to opposite parts of a steering wheel body formed by a metallic core covered by resin; and mutual fixing of the two half-shells along said front surfaces.

2. The method of manufacturing a steering wheel according to claim 1, wherein the mutual fixing of the two half-shells is obtained by application of glue.

3. The method of manufacturing a steering wheel according to claim 1, wherein said hot molding is carried out at a temperature comprised between 120° C. and 180° C.

4. The method of manufacturing a steering wheel according to claim 1, wherein said hot molding is carried out for a time comprised between 1 and 3.5 minutes.

5. The method of manufacturing a steering wheel according to claim 1, wherein said composite materials comprising composite fibers.

6. The method of manufacturing a steering wheel according to claim 5, wherein said composite fibers are impregnated by resin.

7. The method of manufacturing a steering wheel according to claim 1, wherein said composite materials comprising composite fibers and natural materials.

8. The method of manufacturing a steering wheel according to claim 7, wherein said composite fibers are impregnated by resin.

9. The method of manufacturing a steering wheel according to claim 1, wherein said composite materials comprising composite fibers and synthetic materials.

10. The method of manufacturing a steering wheel according to claim 9, wherein said composite fibers are impregnated by resin.

11. The method of manufacturing a steering wheel according to claim 1, wherein said composite materials comprising composite fibers and metal sheets.

12. The method of manufacturing a steering wheel according to claim 11, wherein said composite fibers are impregnated by resin.

\* \* \* \* \*